(12) United States Patent
Bonnard et al.

(10) Patent No.: US 6,633,840 B1
(45) Date of Patent: Oct. 14, 2003

(54) METHOD AND SYSTEM FOR TRANSMITTING DATA ON A SPEECH CHANNEL

(75) Inventors: Pierre Bonnard, Suresnes (FR); Jean Varaldi, Levallois Perret (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/351,326

(22) Filed: Jul. 12, 1999

(30) Foreign Application Priority Data

Jul. 13, 1998 (FR) ............................................. 98 08990

(51) Int. Cl.[7] ............................................. G10L 19/12
(52) U.S. Cl. ....................... 704/229; 704/222; 455/74.1
(58) Field of Search ........................ 704/212, 219–223, 704/229; 455/74, 74.1

(56) References Cited

U.S. PATENT DOCUMENTS

| | | | | |
|---|---|---|---|---|
| 5,255,343 A | * | 10/1993 | Su | 704/242 |
| 5,257,397 A | * | 10/1993 | Barzegar et al. | 455/422 |
| 5,297,183 A | * | 3/1994 | Bareis et al. | 455/410 |
| 5,347,611 A | * | 9/1994 | Chang | 704/206 |
| 5,563,895 A | * | 10/1996 | Malkamaki et al. | 714/748 |
| 5,648,967 A | * | 7/1997 | Schulz | 370/328 |
| 5,717,819 A | * | 2/1998 | Emeott et al. | 704/201 |
| 5,878,062 A | * | 3/1999 | Siira | 714/807 |
| 5,892,802 A | * | 4/1999 | Jung et al. | 370/296 |
| 5,991,716 A | * | 11/1999 | Lehtimaki | 704/212 |
| 6,208,959 B1 | * | 3/2001 | Jonsson et al. | 704/209 |

FOREIGN PATENT DOCUMENTS

| | | | |
|---|---|---|---|
| EP | 0 564 697 A1 | 10/1993 | |
| WO | WO 94/05114 | 3/1994 | |
| WO | WO 95/01072 | * 1/1995 | ............ H04Q/7/30 |
| WO | 96/09708 | * 3/1996 | |
| WO | 96/18275 | * 6/1996 | |
| WO | WO 98/12893 | 3/1998 | |
| WO | WO 98/24253 | 6/1998 | |

* cited by examiner

Primary Examiner—Marsha D. Banks-Harold
Assistant Examiner—Abul K. Azad
(74) Attorney, Agent, or Firm—Sughrue Mion, PLLC

(57) ABSTRACT

To transmit data over a mobile telephone speech channel a source encoder is replaced by a transcoder, a conversion table and/or a concatenation circuit in order to choose from the words produced by the source encoder the ones that are the most robust and which can without difficulty withstand speech synthesis followed by an inverse analysis to reconstitute streams of the bits of the data to be transmitted.

27 Claims, 5 Drawing Sheets

METHOD AND SYSTEM FOR TRANSMITTING DATA ON A SPEECH CHANNEL

The present invention consists in a method and a system for transmitting data on a speech channel, in particular in the field of mobile telephony. However, it could also be used in the field of networks of fixed telephones, known as switched networks. The invention solves problems associated with the particular features associated with data transmission which takes place on a speech channel with the data in the speech channel being transcoded in a manner corresponding to encoding speech in a network.

BACKGROUND OF THE INVENTION

Speech transmission channels and data transmission channels are known in themselves in the field of mobile telephony. Data transmission channels require encoding different from speech encoding. They use network plant that is specific to data mode. In practice, a special contract must be entered into with a mobile telephony operator for this purpose. This provides access to point-to-point transmission of data in circuit-switched mode at a bit rate of 9 600 bit/s.

In the field of GSM cellular telephony, there are data transmission means using signaling channels of the cellular system. A distinction is drawn between SMS (Short Message Service) channels which can transmit at up to 300 bit/s and USSD (Unstructured Supplementary Service Data) channels which can handle bit rates in the order of 800 bit/s. The bit rate is low in both cases. In the case of USSD channels, the information is transmitted only from a user to the network. In the case of SMS channels, the information can be exchanged user to user or from the network to a user and is billed per packet exchanged, the cost at present being high.

The aim of the invention is to enable data of any kind to be transmitted over a network, in particular a mobile telephony network, at a high bit rate and without having to enter into an additional contract. In particular, the invention makes use of Internet access services. It also enables a manufacturer to update and maintain terminals.

What distinguishes speech encoding from data encoding, in particular for transmission in mobile telephony, is essentially the nature of the digitized data representing the speech. Speech digitized in a simple way produces a vast amount of digital data. In the context of mobile telephony, particular types of speech encoding have been developed to prevent the transmission channel frequency congestion that would result from excessively high data bit rates.

These particular types of encoding, known as source encoding, consist in principle in seeking characteristics representative of how speech is produced. These characteristics include three magnitudes, namely:

a fundamental frequency (pitch) corresponding to the vibration of the vocal chords, filtering corresponding to modification of the fundamental vibration and resulting from the propagation of the vibration in the speech system, i.e. the larynx, pharynx and mouth, and an excitation (or error) corresponding to a residue of the preceding modeling of the speech uttered.

A GSM source encoder establishes best values of these three types of magnitude from a PCM (Pulse Code Modulation) signal. A PCM signal is produced by sampling a speech signal at a frequency of 8 000 Hz and quantizing it on 13 bits, for example. The bit rate of the PCM signal is therefore 104 kbit/s in this example. The source encoder performs an operation known as analyzing or encoding the PCM signal.

The remainder of the description refers to a GSM network and transmission of speech when the source encoding is of the "Full Rate" type (ETSI recommendation SMG 6.10). The principles of the invention are nevertheless applicable to other forms of source encoding, or speech formats, in the GSM network (Half-Rate or Adaptive Multi-Rate).

They are also applicable to other mobile telephone networks (DCS-1800, PCS, etc.).

FIG. 1a shows the source encoding of the corresponding PCM signal for a 20 ms frame of a speech signal. This source encoding includes generating 36 bits of a pitch signal (corresponding to a long-term prediction), generating 36 bits of a filter signal and generating 188 bits of an excitation signal, for example. The 36 bits of the filter signal correspond to eight coefficients of a short-term linear prediction filter. The 188 bits of the excitation signal correspond to 60 excitation parameters.

At the receiving end, a synthesizing encoder receives corresponding streams of 260 bits per 20 ms period (and thus at a bit rate of 13 kbit/s). This synthesizing encoder includes programmable filters in cascade. A long-term first filter receives the excitation signals and filters them with filter values corresponding to the 36 bits of the pitch signal. A short-term second filter connected downstream of the first filter filters the resulting signal with filter values corresponding to the 36 bits of the short-term filter signal. Like the original PCM signal, the reconstructed signal has a bit rate of 104 kbit/s.

All of the processing shown in FIG. 1a is effected repetitively. The period of this repetition is 20 ms in the currently-applicable standard. A stream of 260 bits which represent the parameters of the three magnitudes must be produced in each period of this repetition. In the aforementioned standard there are 260 bits to be transmitted every 20 ms, which corresponds to a bit rate of 13 kbit/s.

The source encoding includes the conversion of an analog amplitude (the level of the pressure wave representative of the sound) into three types of magnitude. The first magnitude represents the fundamental frequency or pitch and this parameter is routinely known as the Long Term Prediction (LTP). This first LTP magnitude is encoded in 5 ms sub-frames (four sub-frames per 20 ms) and 9 bits are encoded in each subframe, representing a total of 36 bits per 20 ms frame. The LTP pitch magnitude and the 9 bits encoded each time corresponding to two components: a delay or lag (encoded on 7 bits) defining a pitch period or delay size of the long-term prediction filter and an amplitude (encoded on 2 bits) defining an optimum coefficient of the long-term prediction filter.

The eight coefficients of the short-term filter are expressed in a transformed system called the Log Area Ratio (LAR) or coefficients: LAR1 to LAR8. These coefficients are quantized with variable dynamic ranges depending on their size or their associated energy. Thus, two first coefficients LAR1 and LAR2 of the short-term filter are quantized on 6 bits. The next two coefficients LAR3 and LAR4 are assigned a dynamic range of 5 bits. The next two LAR5 and LAR6 are assigned a dynamic range of 4 bits and the last two LAR7 and LAR8 are assigned a dynamic range of 3 bits. In practice, 36 bits are allocated in this way to the representation of the short-term filter.

In the 260 bits transmitted, the remaining 188 bits (260–36–36) are used to encode the 60 excitation or RPE (Regular Pulse Excitation) parameters. The RPE is calculated, like the pitch signal, in four sub-frames each corresponding to 40 samples (5 ms). The four RPEs calculated in this way are each described in the form of regularly spaced grids with a pitch of three at the initial sampling frequency of 8 kHz. Each grid is described by 15 RPE parameters, namely:

an RPE grid position, encoded on 2 bits, an amplitude on the sub-frame, encoded on 6 bits, and thirteen coefficients describing a relative amplitude of each pulse of the grid (RPE pulses), each encoded on 3 bits.

When a digital message of this kind is encoded in this way, it is channel encoded, when transmitted, so that it can be transmitted on a radio channel subject to a high transmission error rate. The form of channel encoding applied in GSM telephony comprises the following steps shown in FIG. 1b. The first step is concerned with systematic classification of the bits into three categories according to their sensitivity to errors as established by the standard:

class 1a: 50 bits, highly sensitive, class 1b: 132 bits, sensitive, and class 2: 78 bits, insensitive.

This classification is defined in GSM recommendation 5.03. Class 1a essentially concerns the more significant bits of the various parameters. Classes 1b and 2 contain the less significant bits.

A second step includes protecting the bits according to their sensitivity class. This protection is obtained:

for class 1a by adding a cyclic error detection code (CRC) on 3 bits (53 bits at the output), for protected classes 1a and 1b, in combination, four drag bits are added (189 bits at the output); a convolutional error correcting code of ratio ½ is applied to this set of 189 bits, which produces 378 bits at the output, and for the preceding result and the bits of class 2, i.e. 456 bits in total, no additional protection.

The total of 456 bits obtained over the 20 millisecond period is then divided between four successive frames for transmission, for example. Each transmission frame includes, in particular in the TDMA version of the GSM, 577-microsecond time slots during each of which 156 bits are transmitted, as shown in FIG. 1c. The messages on 156 bits include 10 meaningless bits at the start and end of the message, used in particular for synchronization. These 10 bits are essentially used for setting the transmitted power of the mobile telephone transmitter to prevent this power being applied too suddenly and causing percussive distortion.

Then two information streams of 57 bits are sent: they are representative of the message to be transmitted. They are placed on either side of a message on 22 bits relating to the identity of the mobile telephone, the call, or the originator of the message. In the final analysis, twice 57 payload bits representative of the message are therefore sent in a given time slot of a frame. Because the message is sent in four successive frames, 2×57×4=456 bits are sent in four frames, with a duration of 18.46 milliseconds. This means that the bit rate of the channel is slightly higher than the bit rate of the source encoder, and thus the digital message can be transmitted in its entirety.

CDMA type encoding or another cellular (or otherwise) system radio interface can be adopted instead of TDMA encoding, provided that the bit rate of the system is higher than the bit rate of the speech encoder.

At the receiving end, the received digital message undergoes channel decoding corresponding to the above channel encoding and supplies the three types of digital data mentioned above at a rate of 260 bits every 20 milliseconds, plus an indication of any residual errors in the bits of class 1a.

FIG. 2 shows that the encoded and protected speech information is then transmitted by a mobile telephone MS1 to a Public Land Mobile Network (PLMN). The PLMN performs the channel decoding of the speech data in Base Transceiver Stations (BTS) to produce data with the GSM speech format, i.e. as if it had come from a source encoder. The PLMN then transcodes the data with the GSM speech format into data with a format commonly used in circuit-switched networks. This latter format, known as A-law PCM, results in a bit rate of 64 kbit/s corresponding to 8 000 samples per second encoded on 8 bits. This transcoding is performed by a Transcoder Rate Adaptation Unit (TRAU) of the PLMN, generally located at the Mobile Services Switching Centers (MSC) of the networks.

The transcoding performed by the TRAU consists in synthesizing the speech by means of a decoder using the inverse process to that used by the source encoder described above. This produces a speech signal in the Pulse Code Modulation (PCM) form of representation and comprising 8 000 samples per second encoded on 13 bits, like the original signal, to which A-law logarithmic transformation is applied to encode each sample on 8 bits (64 kbit/s). This new form of the speech signal contains all the physical information of the previous signal with the GSM format, ignoring transmission and transcoding errors. This signal with the A-law PCM format is transmitted to a public switched telephone network (PSTN), for example a cable network.

In the PSTN, the 64 kbit/s signal is either converted into an analog signal or is transmitted over digital circuits. It is then routed to an addressee over the switched network or to another TRAU if the addressee is also on a cellular mobile telephone network. This other TRAU, referred to hereinafter as the inverse TRAU because it performs the inverse transformation to that performed by the first TRAU, returns it to the GSM format and bit rate.

FIG. 2 shows that the initial speech signal with the GSM format at 13 kbit/s can thus undergo a plurality of TRAU or inverse transcoding steps. Each transcoding and transmission step can degrade the content of the signal. In particular, if it is required to re-establish the GSM format at 13 kbit/s at the receive end system, the audible speech will be very similar to that at the transmit end system, but the values of the parameters of the model (LTP, LAR, RPE) may be significantly different.

If a voice channel is to be used to transmit data, it is therefore not possible merely to replace the bits descriptive of these parameters in the transmitter with the data to be transmitted if they are to be recoverable at the receiver. This procedure leads to errors at the receiving end of the system. Also transcoders are well suited to manipulating parameters typical of human speech. Random bit configurations are obtained if the bits descriptive of these parameters are replaced with raw data. The analyzer and synthesizer circuits may then not know how to reproduce these configurations. This occurs, for example, if the bit configurations represent sudden variations in the energy of the blocks or the value of the pitch.

OBJECTS AND SUMMARY OF THE INVENTION

The aim of the invention is to remedy the above drawbacks by placing the data bits to be transmitted in the 260 bits of the GSM speech format. The principle of the invention is to satisfy certain constraints. These constraints are:

Constraint 1: it is necessary to make the best possible use of the bits that are most protected by channel encoding.

Constraint 2: it is necessary to avoid introducing configurations or variations that are incompatible with proper functioning of existing TRAU transcoding plant.

Constraint 3: it is necessary to avoid placing information in bits that are not secure with regard to transcoding and transmission.

The invention uses the existing speech transmitter circuits of the PLMN and the PSTN. Mobile telephony and switched network operators must not be required to change their plants. The invention nevertheless uses the speech channels to transmit data, in particular with a bit rate higher than the signaling channels are capable of and at a lower cost than the data channels.

In practice, with the words of 260 bits referred to, there can be $2^{260}$ different binary configurations. Using the invention, some of these configurations will not be recoverable at the remote plant. In the invention, a large number of these are eliminated. The bit configurations eliminated relate to:

constraint 1: in this case the bits of class 2 are not used;

constraint 2: in this case high variations in the amplitude of the pitch or energy values of the frames are excluded;

constraint 3: the least significant bits of the source encoder parameters and the parameters depending on the first analysis steps (RPE) are not used. The values analyzed for the RPE depend greatly on the long-term and short-term filtering steps. Accordingly, the new RPE parameters can be very different from the initial values if these two filters are modified during transmission or transcoding. It is sometimes possible to retain certain magnitudes and an overall trend of the RPE grids throughout transmission, as shown below. These include, for example, the maximum amplitude value of the block and a set of grid configurations resulting from sub-quantizing of the universe of possible "grid-position"—"RPE pulse" values.

The invention looks for configurations of bits among the 260 bits of the 20 ms frame which are interpreted as well as possible in the transcoding and transmission steps. These configurations are authorized configurations. They are referred to as robust configurations. Robust configurations are not fixed as such. A dynamic aspect is introduced by constraint 2. The other configurations are prohibited configurations.

The invention uses a number of robust configurations much lower than $2^{260}$, for example $2^{64}$ configurations. This then constitutes a transcoding system similar to a MODEM function which transcodes each word of the data to be transmitted into robust configurations. The effect of this transcoding is to transcode 64-bit data words to be transmitted into 260-bit words with the GSM speech format. In these 260-bit words, 64 bits identified precisely by their position can have a value which is significant of the message to be transmitted. The remaining 196 bits have fixed values independent of the data to be transmitted. These fixed values can be 1 or 0 chosen to give the greatest robustness.

The invention replaces the source encoder with a specific transcoder. The robust configurations of the transmitted bits are then interpreted correctly by the inverse TRAU circuits and conveyed normally on the PSTN. At the receiving end, in the case of a cable network terminal unit, robust messages are synthesized again with a TRAU from the data transmitted as 64 kbit/s and conveyed at 13 kbit/s with the GSM speech format. A transcoder that performs the inverse process to that performed by the specific transcoder is then used to reconstitute the transmitted data. In the case of a GSM terminal unit, only the inverse transcoding step is needed because the UART transformation will have been done already by a PLMN.

The invention therefore requires, in addition to the standard plant of the networks passed through, only a specific encoder at the transmitter which is substituted for the source encoder and a specific transcoder at the receiver which is the inverse of the previous one.

The invention therefore consists in a method of transmitting data on a speech channel, in particular a mobile telephone channel, wherein:

configurations of binary streams that correspond to prohibited non-robust configurations are identified in this speech encoding scheme, the data to be transmitted is transcoded into data with the speech transmission format, retaining only bit configurations other than the prohibited configurations, the transcoded data is transmitted over a network, in particular a mobile telephone network, and the transcoded data is correspondingly decoded at the receiver.

The invention also consists in a device for transmitting data on a speech channel, in particular a mobile telephone channel, the device including:

a transcoder for transcoding a block of bits to be transmitted available in a block format into a message of bits formatted with a speech transmission format, the block format including a smaller number of bits than the speech transmission format, and a switch for substituting, in the transmission, the message of bits to be transmitted formatted with a speech transmission format for a message delivered by a speech source encoder.

BRIEF DESCRIPTION OF THE DRAWINGS

The invention will be better understood on reading the following description and examining the accompanying drawings. The drawings are given by way of illustrative example only and are not limiting on the invention. In the drawings.

MORE DETAILED DESCRIPTION

Figure 1A:
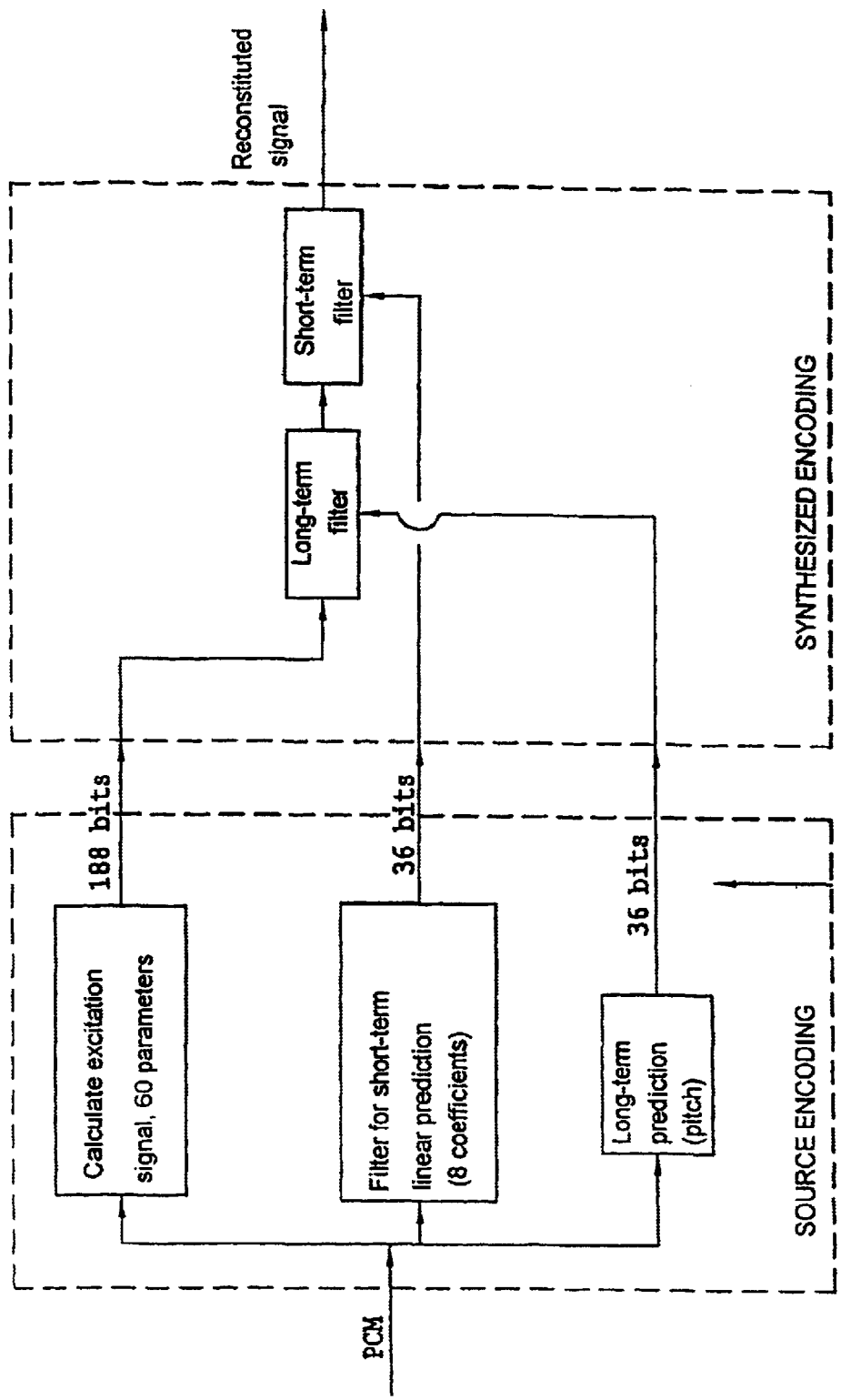
FIGS. 1*a*, 1*b*, and 1*c*, already commented on, show the speech analysis and synthesis steps in the case of a full rate GSM source encoder as used in GSM terminals or TRAU, the formatting of the parameters from the source encoder and their protection prior to transmission over a noisy mobile telephone network.
Figure 1B:
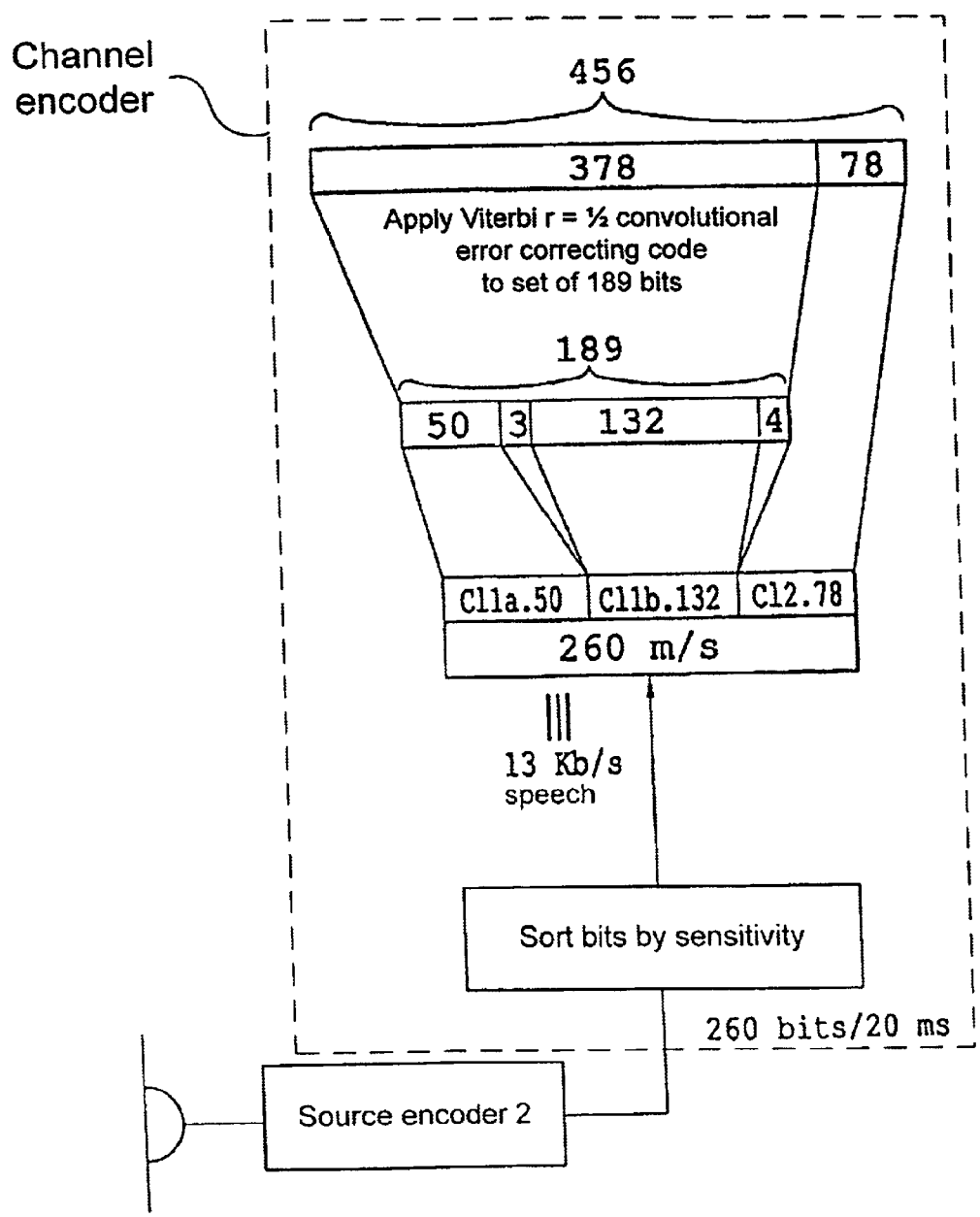
Figure 1C:
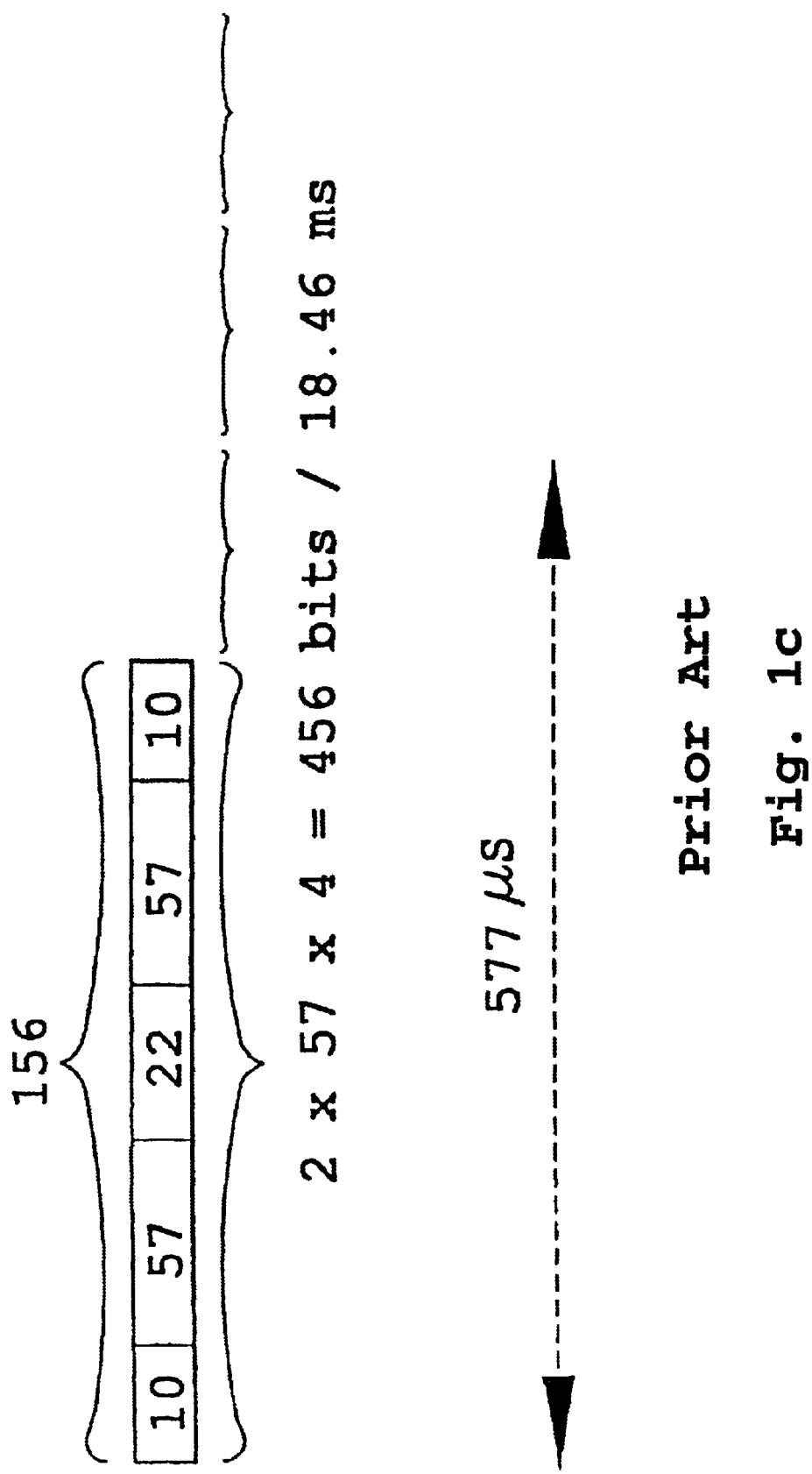
Figure 2:
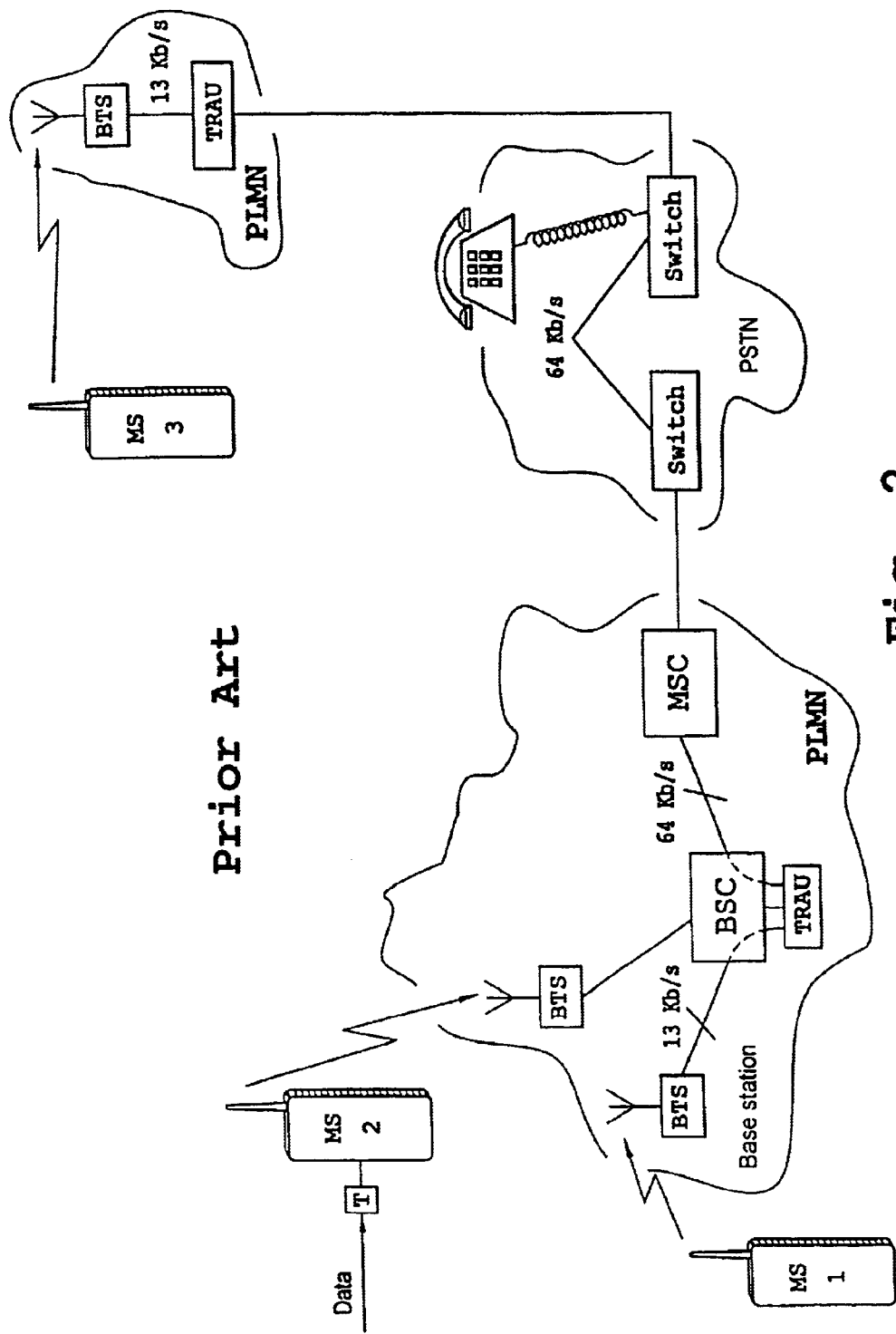
FIG. 2, already commented on, is a diagram showing the GSM network and the various transcoding steps encountered.
Figure 3:
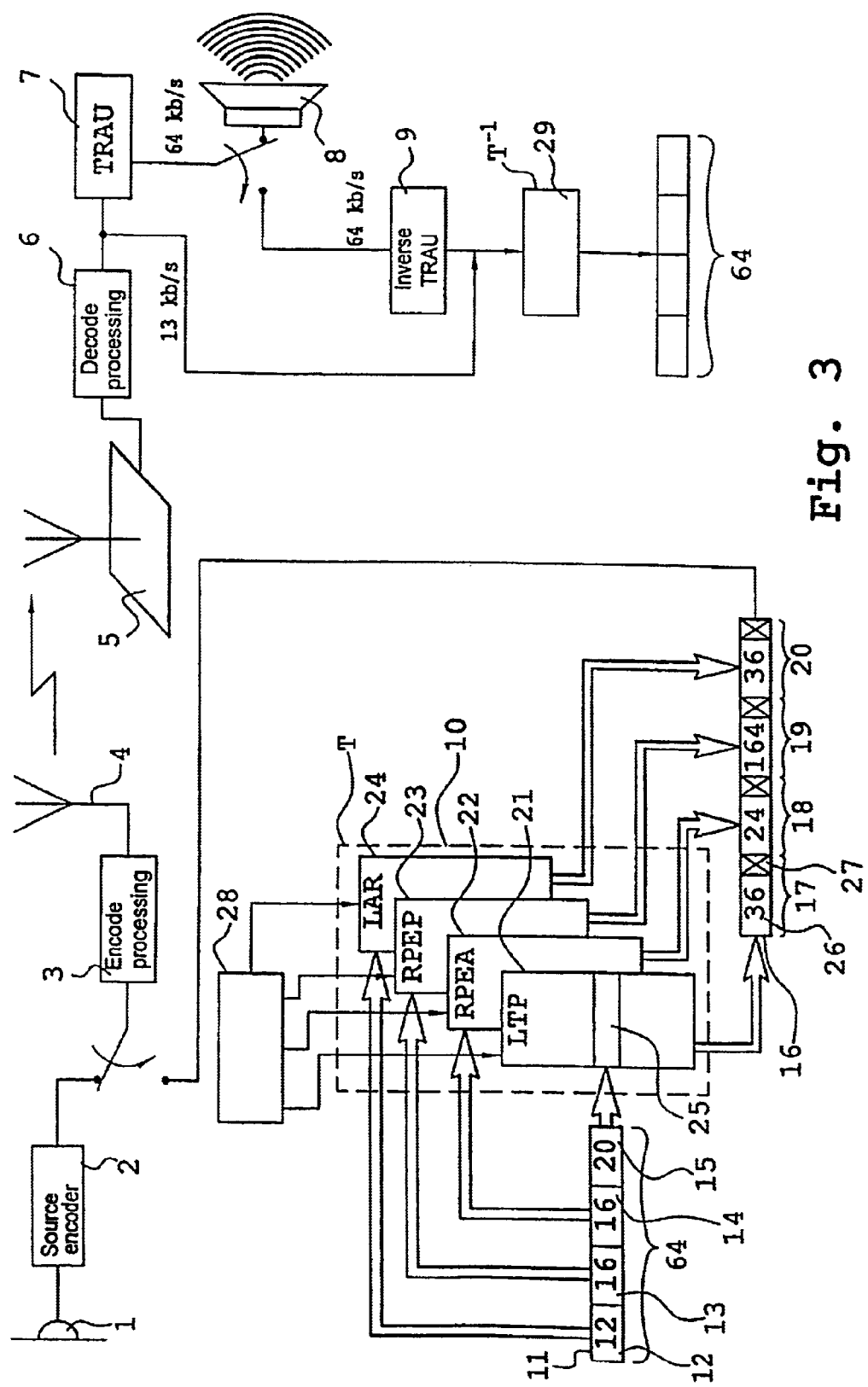
FIG. 3 is a diagrammatic representation of one example of means for implementing the method of the invention.

FIG. 3 shows a transmit-receive system used in mobile telephony to transmit speech messages. A microphone 1 picks up a speaker's speech for example. The speech is encoded, as previously indicated, by a source encoder 2. Before it is transmitted, the digitized data available at the output of the source encoder 2 is processed by a channel encoder 3. It is then passed to a transmitter 4. A base transceiver station 5 linked by radio to the transmitter 4 picks up the transmitted signals and decodes them in a channel decoder 6. It follows from what has previously been explained that the base transceiver station 5 can communicate with the circuits of a switched telephone network operator.

In this case, the operator adapts the bit rate of the data distributed via the decoder 6 in a TRAU 7 before it is sent to the intended recipient, who has the circuits and means needed to convert digitized data into sound waves. These circuits and means are shown diagrammatically as a loudspeaker 8.

The recipient may be connected to a mobile telephone network, in which case the fixed telephone operator converts the high bit rate formatted data into lower bit rate formatted data that can be used by the mobile telephone operator. This conversion is handled by a UART 9 whose function is the inverse of that of the TRAU 7. This means that the circuits 9 are prior art circuits known in themselves.

The invention uses a transcoder 10 to perform a transcoding function T. At its input, the transcoder 10 receives periodically words 11 in a given block format. In one example there are four blocks 12 to 15 in a word 11, respectively comprising 12, 16, 16 and 20 bits, i.e. a total of 64 bits in the word 11. The transcoder 10 periodically outputs word 16 in a different format.

This different format is the speech transmission format, in particular the mobile telephone speech format, as produced by the source encoder 2. The difference lies in the fact that the words 16 are longer than the words 11. A particular feature of the invention is that certain configurations are prohibited in the speech transmission format adopted. The words 11 of the data to be transmitted are therefore necessarily shorter than the words 16 with the speech transmission format actually transmitted.

In the example shown diagrammatically, the words 16 therefore have a length of 260 bits. They are divided into blocks 17 to 20 of 36, 24, 164 and 36 bits, respectively. They are transmitted at periods of 20 ms, and they correspond to four mobile telephone frames for transmission between the transmitter 4 and the base transceiver station 5. The words 16 include a first part 17 encoded on 36 bits representative of pitch, a second part 18 encoded on 24 bits representative of the amplitude parameter of the RPE signal, a third part 19 encoded on 164 bits representative of the RPE grid, and finally a fourth part 20 encoded on 36 bits representative of the short-term filtering LAR coefficients.

According to the invention, prohibited configurations are eliminated from the 260 bits sent in this way and corresponding to a total of $2^{260}$ possible configurations. The following notation is used: B7, B6, B5, B4, B3, B2, B1, B0 are the bits of an 8-bit word in order of decreasing weight.

The following configurations are used for each 5 ms sub-frame of the signal with the speech format.

For the LTP part of this signal, encoded on 9 bits, we use:
for LTP-lag: B6, B5, B4, B3 or four bits out of seven (thus B2, B1 and B0 have a fixed value, for example 0);
for LTP-gain: B1 or one bit in two (thus B0 has a fixed value);

For the RPE part of this signal, encoded on 47 bits in total, we use:
for the amplitude of the block encoded on six bits: B5, B4, B3, B2 or four bits out of six (thus B1 and B0 are fixed);
for the grid position, encoded on two bits: no bit, i.e. zero bits from two (thus B1 and B0 are fixed); and
for the RPE pulses: four bits from the 13×3 (B2, B1, B0)=39 bits available and corresponding to the 13 coefficients. The four bits used define sixteen very different configurations. They are chosen by meshing by maximizing a Euclidean distance among the thirteen encoded coefficients.

In the final analysis, 4+1=5 bits of the signal LTP and 4+4=8 bits of the signal RPE are therefore used in each 5 ms sub-frame. This total of 13 bits used per 5 ms sub-frame means that 52 bits are used per 20 ms frame. By comparison, for a 20 ms frame, 36 bits are normally allocated to the LXTP part of the signal and 188 bits to the RPE part.

The following configurations are used thereafter for each 20 ms frame of the signal with the speech format, for the LAR part of that signal encoded on 36 bits:
LAR1 and LAR2: B5, B4, B3, i.e. twice three bits from the available twice six bits;
LAR3 and LAR4: B4, B3, i.e. twice two bits from the available twice five bits;
LAR5 and LAR6: B3, i.e. twice two bits from the available twice four bits;
LAR7 and LAR8: no bit from the available twice three bits.

B2, B1 and B0 are fixed in all eight cases. Thus 12 bits are used per 20 ms frame rather than the 36 available bits.

In total 52+12=64 bits per 20 ms frame are therefore used. The resulting data bit rate is 3 200 bit/s.

In other words, by neutralizing 196 bits in this way, the number of possible configurations for the words 16 is reduced from $2^{260}$ to $2^{64}$. This is the number of different configurations available for encoding the words 11. For these $2^{64}$ different configurations of the words 16, the imposed bits always have the above-indicated values 1 or 0. This amounts to constructing preferred arrangements of 64 bits from 260. Of course, in these arrangements, the bits which are representative of the data to be transmitted have no imposed value, while the bits which must always have a particular value are fixed and independent of the value of the data to be transmitted.

The transcoding function T from table 10 can consist in addressing a transcoding table using a 64-bit word 11. It may therefore be preferable to implement the circuit 10 in the form of four tables 21 to 24 in non-volatile memories (EEPROM or EPROM) each addressed by words of adequate length. A required block of bits to constitute the word 16 can be taken from each record 25 read in each of the four tables 21 to 25 of the circuit 10.

These blocks can then be concatenated in accordance with the binary stream syntax specified in the standard to constitute periodic messages of 260 bits. In the resulting 260-bit messages, there are parts whose bits are not representative of data to be transmitted but which are determined in such a way as to conform to the parameter continuity criterion.

Thus the portion 15 of word 11, comprising 20 bits, is used to address the table 21 which performs the (imaginary) LPE encoding four times, using five bits each time. For five address bits, table 21 delivers words of nine bits. Read four times in the period of a speech frame, it delivers the 4×9=36 bits of the block 17 of the word 16. A portion 26 of the block 17 represents the data to be transmitted. A portion 27 of the block 17 represents the fixed value bits. All configurations of word 16 in which the bits of the portion 27 have values different from the fixed values are therefore prohibited because they are not robust. The portions with the same fixed character in the words 16 are each represented by a cross, showing that these bits are not available for representing data. The portion 14 of the word 11 comprises 16 bits. This portion is also used four times, at the clock rate of the sub-frames, to read the table 22 with 4-bit addresses. The table 22, corresponding (in an imaginary fashion) to the LPE amplitude encoding then delivers 6-bit words four times. The portion 18 of the word 16 is then obtained by concatenating four times 6 bits. The portion 13 of the word 11 also includes 16 bits. It follows from what has been stated above that it is read four times to address the table 23 four times in a frame of the speech signal. The table 23 therefore transcodes four address bits into 41 bits each time. Of these 41 bits, 39 bits correspond to the RPE P (pulse) portion of the speech signal and two bits correspond to the grid position. These latter two bits are always fixed. Of the 39 bits, only four are at positions representative of data to be transmitted.

Finally, portion 12 of word 11 includes 12 bits. It is used to address the table 24 once per frame and to produce corresponding 36-bit words (portion 20) of the word 16. The words from tables 21, 22, 23 and 24 therefore have respective lengths of 9, 6, 41 and 36 bits. The tables 21, 22, 23 are read four times but the table 24 is read only once, and so the bit rate of the circuit 10 is 4×(9+6+41)+36=260 bits per 20 ms frame.

This dynamic determination of complete words actually transmitted over the network is the responsibility of a control circuit 28. The circuit 28, which includes a microprocessor and a sequencer, can also be responsible, among other things, for verifying the constraints of relative continuity of the magnitudes between frames and sub-frames and corresponding to the transcoding from words 11 to words 16. It is possible to replace the memories 21 to 24 with software imposing, in conjunction with the microprocessor 28, bit values corresponding to the word 11 at the positions of the free bits in the word 16 and fixed values at the other positions. These fixed values can be predefined or modified in accordance with the values of the bits at the free positions.

When data is to be transmitted using the method of the invention, switching at the transmitter causes the channel encoding circuit 3 to be connected to the circuit 10 instead of to the source encoder 2. This switching can be automatic and related to a previous step in negotiating the transfer mode between the communicating terminals. For example, it can result from a signaling step on a speech call or "in-band" signaling.

At the receiver, a receiver circuit using the method of the invention either must or must not include a known type of circuit 9 performing the inverse of the known function 7, whether it is connected to a fixed switch telephone network or not. At the output of a circuit 9 of the above kind, i.e. after the cascade of circuits 6, 7 and 9, the bit rate has therefore been restored to 13 kbit/s and the formatting is that of the source encoding. Mobile to cable calls are distinguished from mobile to mobile calls. In cascade with an inverse TRAU 9 of this kind, or respectively directly in cascade with a channel decoder circuit 6 in the case of a mobile to mobile link, a circuit 29 performs decoding using a function $T^{-1}$ which is the inverse of the encoding function T performed by the circuit 10. The circuit 29 can also include tables. Speech/data switching at the receiver can therefore be imposed merely by the nature of the plant installed on the receiver site or by the negotiation step referred to above.

If the receiving system is a mobile telephone, it receives directly messages with the mobile telephone transmission format (260 bits per word every 20 ms). In this case, on decoding, the circuit 9 does is not needed because its function is performed (if necessary) by the fixed telephone operator.

To summarize, mobile telephones provided with means for implementing the method of the invention include the transmitter circuit 10 and the receiver circuit 29. These two circuits are administered by the microprocessor 28. The fixed plant connected to a switched telephone network and the plant beneficial for implementing the method of the invention must include a circuit 9 and a circuit 29 in the receiver.

For transmitting data to a mobile telephone on a speech channel from a telephone connected to a switched network, the transmitter must include a circuit 10 and a circuit 28. The mobile telephone operator carries out the necessary bit rate conversion for radio transmission using a circuit 7 and a circuit 9. At the receiver, i.e. at the mobile telephone, only the circuit 29 is required.

With the example referred to, 64 bits can be transmitted in each 20 ms period. This represents a bit rate of 3 200 bit/s.

It is possible to adopt an empirical approach to involve more than the 64 bits as candidates for robust configurations. For example, 100 bits or more can be envisaged. An empirical approach of this kind, related to each type of source encoder (and corresponding TRAU) is preferably based on the use of programmable tables 21 to 24. When the true definition of function T has been found, a specific concatenation circuit can be formed using the microprocessor 28 and appropriate concatenation software.

Finally, echo can occur in a mobile telephone or when a speech signal is transmitted in the network. Enabling an echo cancellation function to attenuate this is known in itself. This function modifies the transmitted signal. There is a risk of degrading the content of the message in situations where the parameters of the encoded speech are replaced by random data. It is therefore necessary to disable echo cancellation functions to apply the invention. For the same reasons, voice activity detection functions whose only aim is to transmit comfort noise when the other party is not speaking must be deactivated when the invention is used.

What is claimed is:

1. A method of transmitting digital data between two telecommunication terminals on a speech channel, in particular a mobile telephone channel, via a telecommunication network comprising speech signal transcoders, the speech signals exchanged between said terminals being encoded and decoded in each terminal in accordance with a predetermined speech encoding scheme having a speech transmission format, wherein K-bit binary streams represent speech information over predetermined intervals, comprising:

identifying bit configurations of said K-bit binary streams that are compatible with the transcoders (TRAU) of the telecommunication network, each of said identified bit configurations including at most K–L bits having values dependent on content of said digital data;

transcoding the digital data into transcoded data with the speech transmission format using only said identified bit configurations, the transcoded data comprising K-bit words in which (K–L) bits have values dependent on the content of the digital data, and the remaining L bits have values independent of the content of the digital data, where both K and L are integers, K is greater than L, and L is greater than zero;

transmitting the transcoded data over said telecommunications network; and decoding the transmitted transcoded data at the receiver, wherein said identifying the bit configurations of said binary streams that are compatible with the transcoders of the telecommunication network includes application of at least one of the following steps:

excluding bits of the speech transmission format which are not protected by an error correcting code when transmitted as being used for said (K–L) bits having values dependent on the content of said digital data;

excluding high variations in amplitude of pitch or energy values between successive K-bit binary streams; and excluding least significant bits of parameters within the speech transmission format as being used for said (K–L) bits having values dependent on the content of said digital data.

2. A method according to claim 1, wherein:

the bit rate and/or mobile telephone transmission format are adapted to a bit rate and/or a switched network telephone transmission format, and after transmission over the switch network:

for decoding, the bit rate or the format is inversely adapted, and inverse transcoding is effected.

3. A method according to claim 1, wherein transcoding is effected by allocating to a data message transmitted with a mobile telephone format bits whose value is determined according to their place in the transmitted message.

4. A method according to claim 1, wherein the speech encoding is source encoding and includes, for the speech uttered, fundamental frequency encoding, filter encoding, and excitation encoding.

5. A method according to claim 1, wherein a transcoding table is used for transcoding.

6. A method according to claim 1, wherein, for transcoding, digital data bits are concatenated with bits having imposed values to produce a message to be transmitted having a source encoder output format which includes a different number of bits than a format of the bits of the digital data.

7. A method according to claim 1, wherein as the transcoded data is transmitted over the network, speech signal transcoders within said network between said two telecommunications terminals interpret the transcoded data as speech, such that the transcoded data passes through the network in a same manner as speech, and when the transcoded data is correspondingly decoded at the receiver, the digital data is reconstituted.

8. A method according to claim 1, wherein said two telecommunication terminals are telephones.

9. A method according to claim 1, wherein said predetermined speech encoding scheme does not use at least some least significant bits within the speech transmission format to encode said digital data, values independent of the content of said digital data being substituted for said at least some least significant bits.

10. A method according to claim 9, wherein the speech transmission format includes fundamental frequency encoding, filter encoding, and excitation encoding, and said at least some least significant bits are least significant bits within at least one of the fundamental frequency encoding, the filter encoding, and the excitation encoding.

11. A method according to claim 1, further comprising applying an error code to some bits of the transcoded data with the speech transmission format, prior to transmission, wherein the error code is not applied to other bits of data with the speech transmission format, and wherein values of said other bits are independent of the content of said digital data.

12. A method according to claim 1, wherein said identifying the configurations of said binary streams that are compatible with the transcoders of the telecommunication network includes application of all of the following steps:

excluding bits of the speech transmission format which are not protected by an error correcting code when transmitted as being used for said (K–L) bits having values dependent on the content of said digital data;

excluding high variations in amplitude of pitch or energy values between successive K-bit binary streams; and excluding least significant bits of parameters within the speech transmission format as being used for said (K–L) bits having values dependent on the content of said digital data.

13. A method according to claim 1, wherein at least some of the L bits of said transcoded data maintain parameter continuity between successive K-bit binary streams.

14. A device for transmitting digital data between two telecommunications terminals on a speech channel, in particular in a mobile telephone channel, via a telecommunications network comprising speech signals transcoders, the device including:

a transcoder for transcoding the digital data into transcoded data with the speech transmission format, using only configurations of the speech encoding scheme which are compatible with the speech signal transcoders of the telecommunications network, and a switch for substituting, in the transmission, the transcoded data with the speech transmission format for a message delivered by a speech source encoder in the speech transmission format, wherein said speech transmission format uses K-bit binary streams representing speech information over predetermined intervals, wherein the transcoded data comprises K-bit words in which (K–L) bits have values dependent on content of the digital data and the remaining L bits have values independent of the content of the digital data, where both K and L are integers, K is greater than L, and L is greater than zero, and the transcoder excludes at least one of:

bits of the speech transmission format which are not protected by an error correcting code when transmitted, as being used for said (K–L) bits dependent on the content of the digital data;

high variations in amplitude of pitch or energy values between successive K-bit binary streams; and least significant bits of parameters within the speech transmission format, as being used for said (K–L) bits dependent on the content of the digital data.

15. A device according to claim 14, wherein the transcoder is adapted to transcode a block of bits to be transmitted available with a block format into a message of bits formatted with a speech transmission format, the block format including a number of bits less than the number of bits of the speech transmission format.

16. A device according to claim 14, wherein the transcoder includes a table.

17. A device according to claim 14, wherein the transcoder includes a circuit for concatenating bits of the block of bits of the digital data with bits of fixed value to form the message of bits formatted with the speech transmission format.

18. A device according to claim 14, including, at the receiving end, a circuit for adapting the speech format in cascade with an inverse transcoder.

19. A method according to claim 14, wherein said transcoder encodes the digital data to pass through the transcoders of the telecommunications network as speech, to be reconstituted as the digital data, after passing through the telecommunications network, when decoded by a receiving terminal.

20. A device according to claim 14, wherein said two telecommunication terminals are telephones.

21. A device according to claim 14, wherein said transcoder does not use at least some least significant bits within the speech transmission format to encode the digital data, values independent of the content of the digital data being substituted for said at least some least significant bits.

22. A device according to claim 21, wherein the speech transmission format includes fundamental frequency encoding, filter encoding, and excitation encoding, and said at least some least significant bits are least significant bits within at least one of the fundamental frequency encoding, the filter encoding, and the excitation encoding.

23. A device according to claim 14, further comprising a channel encoder, receiving the messages output by said switch and adapted to apply an error code to some bits of the transcoded data formatted with the speech transmission format, wherein the error code is not applied to other bits of data formatted with the speech transmission format, and wherein said other bits are set to values independent of the content of said digital data by said transcoder.

24. A device according to claim 14, wherein said transcoder excludes all:

bits of the speech transmission format which are not protected by an error correcting code when transmitted, as being used for said (K–L) bits dependent on the content of the digital data;

high variations in amplitude of pitch or energy values between successive K-bit binary streams; and least significant bits of parameters within the speech transmission format, as being used for said (K–L) bits dependent on the content of the digital data.

25. A device according to claim 14, wherein at least some of the L bits of said a transcoded data maintain parameter continuity between successive K-bit binary streams.

26. A method of transmitting digital data between two telecommunication terminals on a mobile telephone speech channel, via a telecommunication network comprising speech signal transcoders, the speech signals exchanged between said terminals being encoded and decoded in each terminal in accordance with a predetermined speech encoding scheme having a speech transmission format wherein K-bit binary streams contain plural segments each representing a different aspect of speech information over predetermined intervals, said method comprising:

for each of said segments, identifying a respective number of configurations of bits which can be used to represent the digital data, the identified configurations being compatible with the speech signal transcoders of said telecommunications network;

transcoding the digital data into transcoded data with the speech transmission format, using only said identified configurations in each of said segments, the transcoded data comprising K-bit words in which (K–L) bits have values dependent on the content of the digital data and the remaining L bits have values independent of the content of the digital data, where both K and L are integers, K is greater than L, and L is greater than zero, and transmitting said transcoded data over said network.

27. A method according to claim 26, wherein at least some of the L bits of said transcoded data maintain parameter continuity between successive K-bit binary streams.

* * * * *